US008224120B2

(12) United States Patent
Hamada et al.

(10) Patent No.: US 8,224,120 B2
(45) Date of Patent: Jul. 17, 2012

(54) IMAGE SIGNAL PROCESSING APPARATUS AND IMAGE SIGNAL PROCESSING METHOD

(75) Inventors: Koichi Hamada, Yokohama (JP);
Masahiro Kageyama, Hino (JP);
Kenichi Yoneji, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 669 days.

(21) Appl. No.: 12/474,803

(22) Filed: May 29, 2009

(65) Prior Publication Data
US 2010/0074536 A1 Mar. 25, 2010

(30) Foreign Application Priority Data

Sep. 22, 2008 (JP) ................................. 2008-241959

(51) Int. Cl.
*G06K 9/36* (2006.01)

(52) U.S. Cl. ...................................................... 382/290

(58) Field of Classification Search .................. 327/558;
348/208.13, E11.013; 358/3.07; 382/264,
382/290, 299; 702/193; 708/671
See application file for complete search history.

(56) References Cited

U.S. PATENT DOCUMENTS

| 5,911,124 A | 6/1999 | Doran | |
|---|---|---|---|
| 2005/0253967 A1 | 11/2005 | Yoshida | |
| 2008/0174699 A1* | 7/2008 | Suzuki et al. | 348/607 |
| 2009/0009660 A1* | 1/2009 | Kageyama et al. | 348/452 |

FOREIGN PATENT DOCUMENTS

| EP | 1 895 467 A2 | 3/2008 |
|---|---|---|
| JP | 2009-015025 | 1/2009 |

OTHER PUBLICATIONS

Extended European Search Report issued in European Patent Application No. EP 09251466.0 dated Oct. 6, 2011.
S. Farsiu et al., "Fast and Robust Multiframe Super Resolution," IEEE Transactions on Image Processing, vol. 13, No. 10, Oct. 2004.

* cited by examiner

*Primary Examiner* — Gregory F Cunningham
(74) *Attorney, Agent, or Firm* — McDermott Will & Emery LLP (57) ABSTRACT

To perform an image processing for high resolution more suitably on even an image signal having images with different resolutions mixed therein. An image signal processing method of the present invention includes the steps of: performing a spatial low pass filter processing on a first image signal that is an input image; generating a second image signal by performing an image processing for high resolution on an image after the low pass filter processing; comparing corresponding regions in the first image signal and the second image signal; and selecting either of the first image signal and the second image signal with respect to the region based on this comparison result.

15 Claims, 8 Drawing Sheets

IMAGE SIGNAL PROCESSING APPARATUS AND IMAGE SIGNAL PROCESSING METHOD

INCORPORATION BY REFERENCE

The present application claims priority from Japanese application JP2008-241959 filed on Sep. 22, 2008, the content of which is hereby incorporated by reference into this application.

BACKGROUND OF THE INVENTION

The present invention relates to an image processing technology for obtaining high resolution of an image In television receivers, as the screen size has been becoming larger, an image signal input from broadcasting, communications, a storage medium, or the like is not displayed on a screen as it is entered, but an image signal is usually displayed on a screen after increasing the number of pixels in the horizontal and vertical directions. In this case, it is impossible to increase the resolution just by increasing the number of pixels by means of a low pass filter using a commonly-known spline function or sinc function, or the like.

Then, a super-resolution technology for increasing the number of pixels while achieving high resolution by combining a plurality of input image frames (hereinafter, abbreviated as "frame") into one frame has been disclosed in Sina Farsiu, M. Dirk Robinson, Michael Elad, Peyman Milanfar, "Fast and Robust Multiframe Super Resolution", IEEE Transactions on Image Processing, VOL. 13, NO. 10, October 2004.

SUMMARY OF THE INVENTION

In order to perform the image processing for high resolution using the technology described in Sina Farsiu, M. Dirk Robinson, Michael Elad, Peyman Milanfar, "Fast and Robust Multiframe Super Resolution", IEEE Transactions on Image Processing, VOL. 13, NO. 10, October 2004, the image size before enlargement processing and the image size after the image processing for high resolution need to be known in advance and therefore an appropriate image processing for high resolution may not be performed.

The present invention has been made in view of the above-described problem. It is thus an object of the present invention to perform an image processing for high resolution more suitably on even an image signal having images with different resolutions mixed therein.

In order to solve the above-described problem, an image signal processing apparatus of an embodiment of the present invention may be configured as described in appended claims, for example.

According to the present invention, the image processing for high resolution can be performed more suitably on even an image signal having images with different resolutions mixed therein.

Other objects, features and advantages of the invention will become apparent from the following description of the embodiments of the invention taken in conjunction with the accompanying drawings.

DESCRIPTION OF THE EMBODIMENTS

Hereinafter, embodiments of the present invention will be described.

Figure 10:
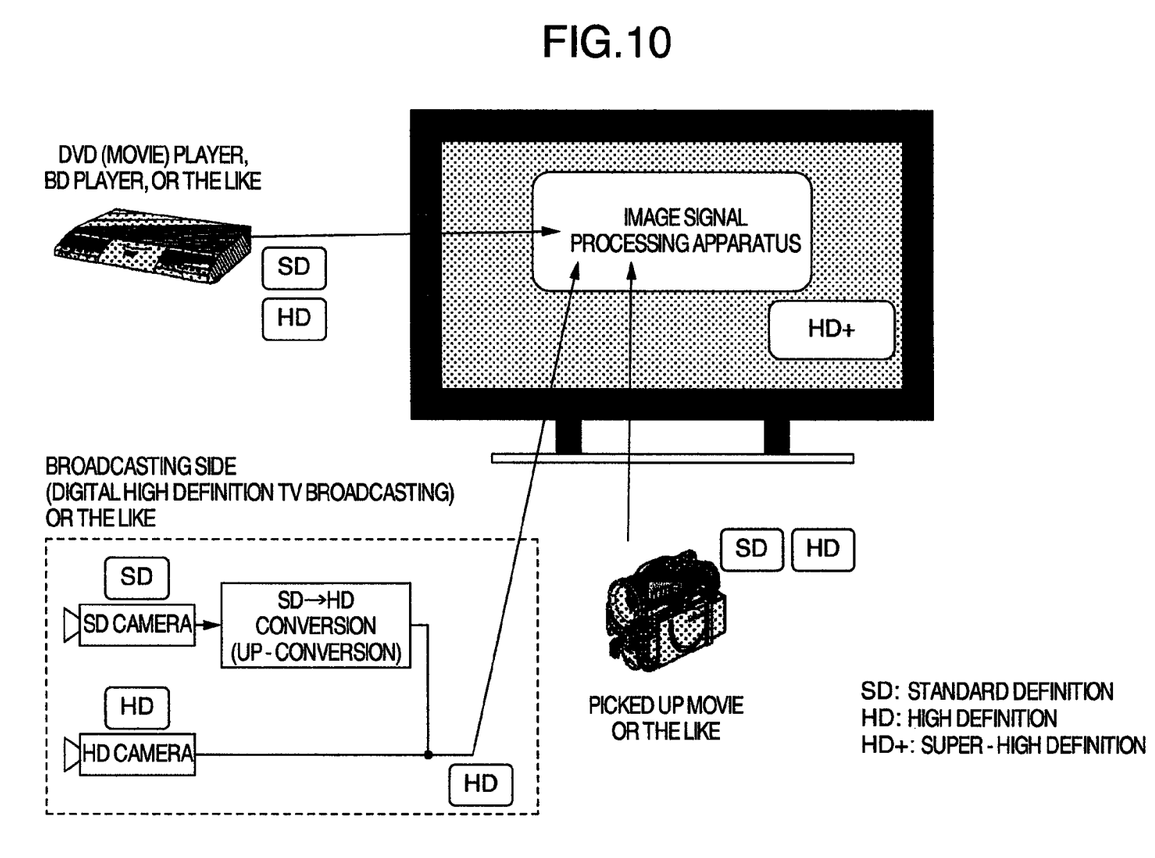
FIG. 10 is an explanatory view of an example of an input signal according to the present invention.

First, an example of an input image signal of each of the embodiments of the present invention is described using FIG. 10.

In an apparatus of each of the embodiments of the present invention, an SD image signal (standard definition image signal) and an HD image signal (high definition image signal) are input from, for example, a DVD (Digital Video Disk or Digital Versatile Disk) or BD (Blu-ray Disk) player, an imaging apparatus, or a broadcasting station. In this case, in particular, in an image signal or the like broadcasted from a broadcasting station, an up-converted image signal obtained by increasing the number of pixels of an SD image signal of an image, which is picked up by an SD video compatible camera, and an HD image signal of an image, which is picked up by an HD video compatible camera, may be mixed between frames or in a frame. The apparatus of each of the embodiments of the present invention turns these images into high definition images. For example, if an input image is an SD image signal, it is converted into an HD image signal, and if the input image is an HD image signal, it is converted into an HD+ image signal (super high definition image signal).

Embodiment 1

Figure 1:
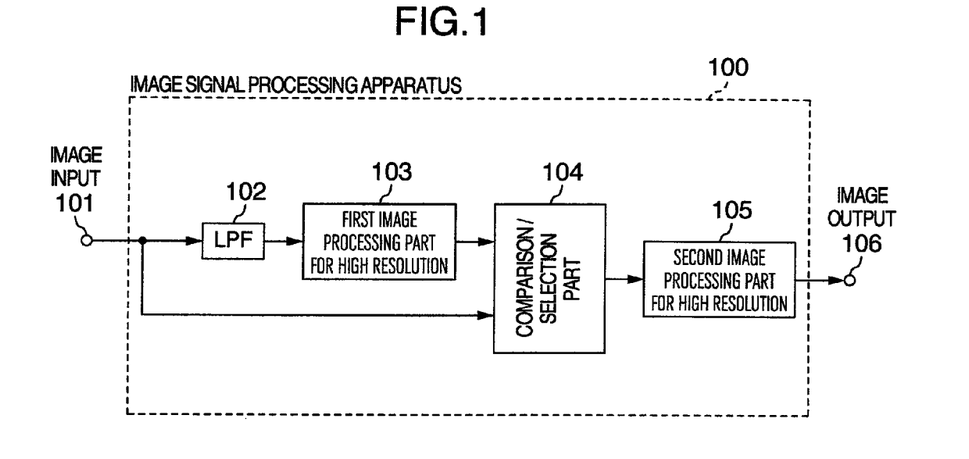
FIG. 1 is an explanatory view of Embodiment 1 of the present invention.

Next, a configuration of an image signal processing apparatus according to Embodiment 1 is described using FIG. 1.

In the image signal processing apparatus according to Embodiment 1, an image signal as shown in FIG. 10 is input to an image input part (101). An LPF part (102) converts an input image into a low resolution image by performing a spatial low pass filter processing. In this case, the high frequency components of the input image are cut, so even if the input image is a high resolution image or a low resolution image, an image after passing through the LPF part (102) is a low resolution image. Next, a first image processing part for high resolution (103) performs an image processing for high resolution on the low resolution image output from the LPF part (102) to convert this into a high resolution image signal. Here, the image processing for high resolution in the first image processing part for high resolution (103) is, for example, a super-resolution processing or the like for reducing aliasing. A comparison/selection part (104) compares the high resolution image signal with the input image signal, and selects either of the high resolution image signal and the input image signal. Here, the comparison processing and the selection processing of the comparison/selection part (104) may be performed in a unit of pixel or may be performed in a unit of region comprising a plurality of pixels. A second image processing part for high resolution (105) performs an image processing for high resolution on an image signal selected by the comparison/selection part (104). Here, the image processing for high resolution in the second image processing part for high resolution (105) is an edge enhancement processing, for example. An image signal processed by the second image processing part for high resolution (105) is outputted to an image output part (106).

Figure 3:
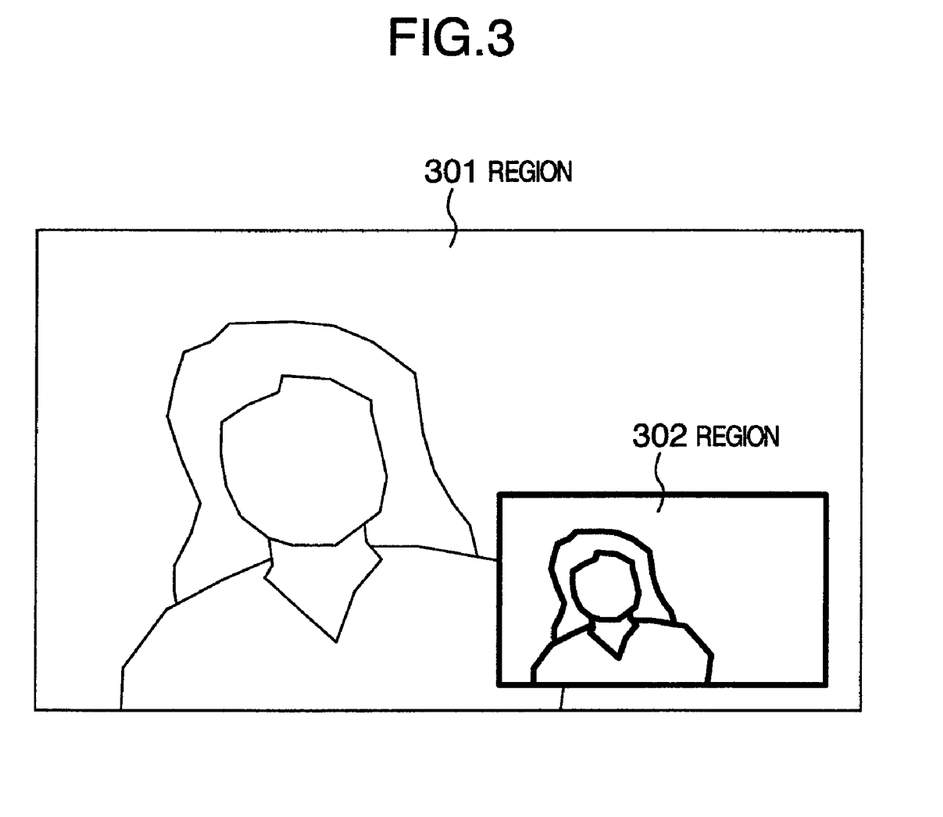
FIG. 3 is an explanatory view of an example of an input image according to the present invention.

Here, an example of the input image as shown in FIG. 10 is shown in FIG. 3. An example of the image of FIG. 3 is an image generated by superimposing different images as with those in a region (301) and region (302). In the respective regions, there may be a low resolution image, which is an up-converted image signal obtained by increasing the number of pixels of an SD image signal, or there may be a high resolution image picked up by an HD video compatible camera. In the example of FIG. 3, these images are mixed in a frame.

Figure 4:
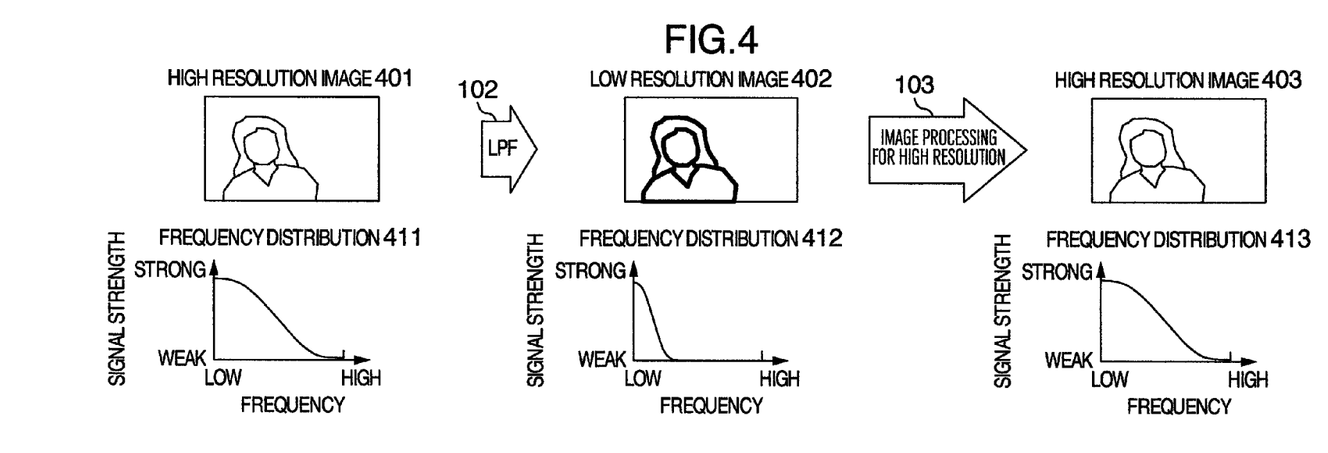
FIG. 4 is an explanatory view of an example of an image signal processing according to the present invention.
Figure 5:
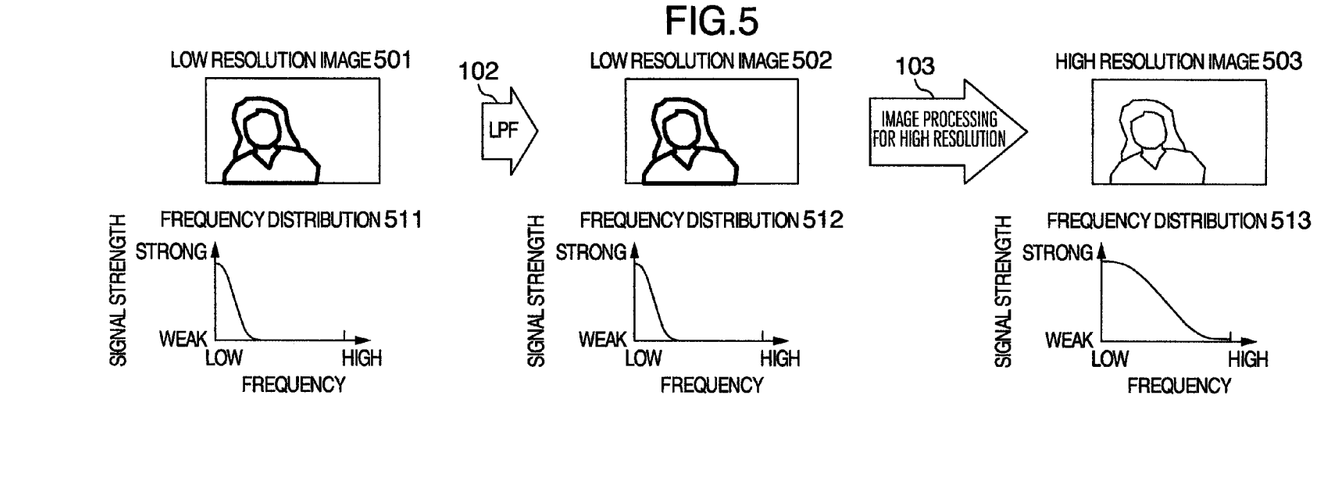
FIG. 5 is an explanatory view of an example of an image signal processing according to the present invention.

Next, the comparison/selection operation of an image signal by the LPF part (102), the first image processing part for high resolution (103), and the comparison/selection part (104) is described using FIG. 4 and FIG. 5. In the following examples, an example is shown in which the comparison/selection part (104) determines whether an image in the region (302) of the input image is a high resolution image or a low resolution image by the comparison processing.

First, FIG. 4 shows an example in which the image in the region (302) of an input image is a high resolution image, for example. At this time, a high resolution image (401) is input to the LPF part (102). Here, the LPF part (102) performs the low pass filter processing on the high resolution image (401) to generate a low resolution image (402), and outputs this to the first image processing part for high resolution (103). The first image processing part for high resolution (103) performs an image processing for high resolution for reducing aliasing of the low resolution image (402) and restoring the high frequency components, thereby generating a high resolution image (403).

Here, the frequency components of the high resolution image (401), the low resolution image (402), and the high resolution image (403) are, for example, a frequency component (411), a frequency component (412), and a frequency component (413), respectively, as shown in the view.

Namely, the frequency component (412) of the low resolution image (402) has a high frequency component reduced relative to the frequency component (411) of the high resolution image (401) due to the low pass filter processing of the LPF part (102).

Moreover, the frequency component (413) of the high resolution image (403) has a high frequency component increased relative to the frequency component (412) of the low resolution image (402) due to the image processing for high resolution of the first image processing part for high resolution (103).

On the other hand, FIG. 5 shows an example in which the image in the region (302) of an input image is a low resolution image, for example. At this time, a low resolution image (501) is input to the LPF part (102). Here, the LPF part (102) performs a low pass filter processing on the low resolution image (501), and outputs a low resolution image (502) to the first image processing part for high resolution (103). The first image processing part for high resolution (103) performs an image processing for high resolution for reducing aliasing of the low resolution image (502) and restoring the high frequency components, thereby generating a high resolution image (503).

Here, the frequency components of the low resolution image (501), the low resolution image (502), and the high resolution image (503) are, for example, a frequency component (511), a frequency component (512), and a frequency component (513), respectively, as shown in the view.

That is, the frequency component (511) of the low resolution image (501) originally contains a small amount of high frequency components, so even if the low pass filter processing of the LPF part (102) is performed, the frequency component (512) of the low resolution image (502) does not change much like in the example of the frequency component (411) and the frequency component (412) of FIG. 4.

However, the frequency component (513) of the high resolution image (503) has a high frequency component increased relative to the frequency component (512) of the low resolution image (502) due to the image processing for high resolution of the first image processing part for high resolution (103), as with the example of the frequency component (412) and the frequency component (413) of FIG. 4.

Here, the comparison/selection part (104) according to Embodiment 1 compares the frequency component of the input image to the LPF part (102) (input image to the image signal processing apparatus (100)) with the frequency component of the output image from the first image processing part for high resolution (103) shown in FIG. 4 and FIG. 5, thereby determining whether the input image to the LPF part (102) is a low resolution image or a high resolution image. Specifically, the frequency component of the input image to the LPF part (102) is compared with the frequency component of the output image from the first image processing part for high resolution (103).

Here, as shown in FIG. 5, when an input image to the LPF part (102) is a low resolution image, there is a large difference in the signal strength in the high frequency component of between the frequency component (511) and the frequency component (513).

On the other hand, as shown in FIG. 4, when an input image to the LPF part (102) is a high resolution image, each of the frequency component (411) and the frequency component (413) has a signal strength in the high frequency component higher than the frequency component (412) of the low resolution image (402), so there is not much difference in the high frequency component of between the frequency component (411) and the frequency component (413) as compared with between the frequency component (511) and the frequency component (513) of FIG. 5.

Thus, the comparison/selection part (104) according to Embodiment 1 compares the frequency component of an input image to the LPF part (102) with the frequency component of the output image from the first image processing part for high resolution (103), and if the difference in the frequency component is small, the comparison/selection part (104) determines that the input image to the image signal processing apparatus (100) is a high resolution image, and selects and outputs the input image.

Moreover, the comparison/selection part (104) according to Embodiment 1 compares the frequency component of an input image to the LPF part (102) with the frequency component of the output image from the first image processing part for high resolution (103), and if the difference in the frequency component is large, the comparison/selection part (104) determines that the input image to the image signal processing apparatus (100) is a low resolution image, and selects and outputs the output image from the first image processing part for high resolution (103).

Note that, in the above description, the determination processing in the region (302) has been taken as an example, however, for the region (301), it is also possible to determine whether the input image is a low resolution image or a high resolution image by performing the similar determination processing.

Note that the determination of whether or not the resolution of an input image is high may be based on the magnitude of the first-order differentiation of an image around a target pixel or may be based on the variance of the pixel value, for example.

By configuring the LPF part (102), the first image processing part for high resolution (103), and the comparison/selection part (104) in this manner, the comparison/selection part (104) according to Embodiment 1 can discriminate between a low resolution image region and a high resolution image region, with respect to an image signal having the low resolution image region and the high resolution image region mixed in an input image.

An image signal selected by the comparison/selection part (104) is subjected to the image processing for high resolution by the second image processing part for high resolution (105) and output. However, an image signal selected by the comparison/selection part (104) may be output as is without being subjected to the image processing for high resolution by the second image processing part for high resolution (105).

Thus, when the image processing for high resolution by the second image processing part for high resolution (105) is performed in the image signal processing apparatus (100), an image in the low resolution region of an input image input to the image signal processing apparatus (100) is subjected to the low pass filter processing of the LPF part (102) and the aliasing reduction processing of the first image processing part for high resolution (103), and the resultant image signal is further subjected to the edge enhancement processing of the second image processing part for high resolution (105) and output. At this time, an image in the high resolution image region of an input image input to the image signal processing apparatus (100) is not subjected to the processings of the LPF part (102) and the first image processing part for high resolution (103), and an image signal of an input image signal, upon which the edge enhancement processing of the second image processing part for high resolution (105) has been performed, is output. Thus, in performing the image processing for high resolution by the second image processing part for high resolution (105), the image signal processing apparatus (100) can perform a suitable image processing for high resolution depending on the resolution for each region, with respect to an image signal having a low resolution image region and a high resolution image region mixed in an input image.

Moreover, when the image processing for high resolution by the second image processing part for high resolution (105) is not performed in the image signal processing apparatus (100), an image in the low resolution image region of an input image input to the image signal processing apparatus (100) is subjected to the low pass filter processing of the LPF part (102) and the aliasing reduction processing of the first image processing part for high resolution (103), and the resultant image signal is output. At this time, an image signal in the high resolution image region of an input image input to the image signal processing apparatus (100) is output without being subjected to any one of the following processings of the LPF part (102), the first image processing part for high resolution (103), and the second image processing part for high resolution (105). Thus, when the image processing for high resolution by the second image processing part for high resolution (105) is not performed, the image signal processing apparatus (100) can, with respect to an image signal having a low resolution image region and a high resolution image region mixed in an input image, select whether or not the image processing for high resolution is required depending on the resolution for each region, and perform a suitable image processing for high resolution as the entire screen of the input image.

Figure 8:
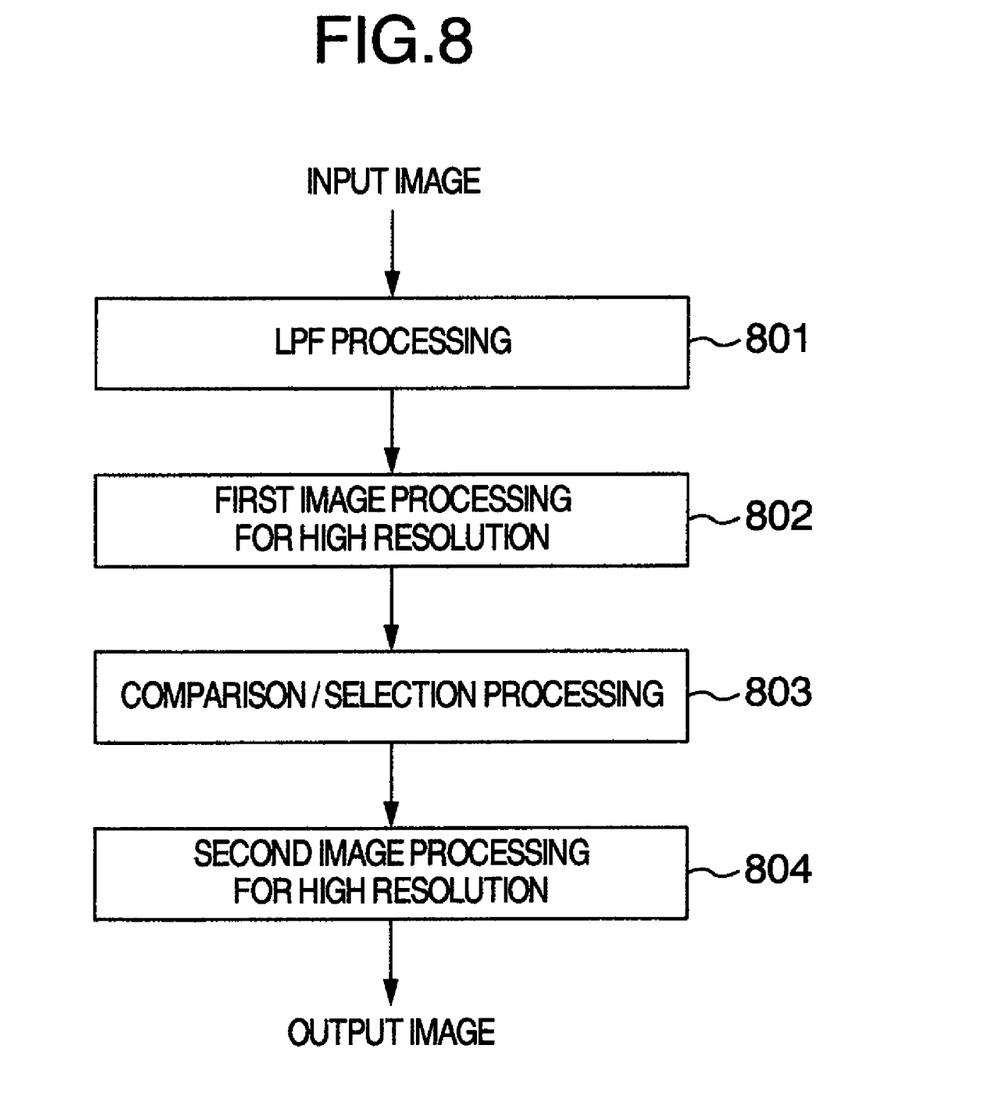
FIG. 8 is an explanatory view of Embodiment 1 of the present invention.

Next, a flow of the image signal processing according to Embodiment 1 is described using FIG. 8.

First, the LPF processing is performed on an input image signal to generate a low resolution image from the input image signal (801). Next, the image processing for high resolution is performed on the image signal upon which the LPF processing has been performed (802). Here, the image processing for high resolution is, for example, a super-resolution processing or the like for reducing aliasing. Next, an image signal upon which the image processing for high resolution has been performed is compared with the input image signal to select either of the high resolution image signal and the input image signal (803). Here, the comparison processing and the selection processing may be performed in a unit of pixel or may be performed in a unit of region comprising a plurality of pixels. Next, when the input image signal is selected in the comparison/selection step (803), the image processing for high resolution is performed on the input image signal, and the resultant high resolution image signal is output (804). Here, the image processing for high resolution in the second image processing part for high resolution (105) is an image processing for high resolution for performing the edge enhancement processing, for example.

According to the image signal processing apparatus of Embodiment 1 described above, with respect to an image signal having a low resolution image region and a high resolution image region mixed in an input image, the low resolution image signal and the high resolution signal can be compared with each other and discriminated. Moreover, by selecting an output image signal based on the comparison and discrimination results, it is possible to select an image processing for high resolution suitable for each of the low resolution image region and the high resolution image region, or select whether or not the image processing for high resolution is required. Therefore, according to the image signal processing apparatus of Embodiment 1, the image processing for high resolution can be performed more suitably on even an image signal having images with different resolutions mixed therein.

According to Embodiment 1, it is possible to estimate an image signal region to be up-converted and a high definition image signal region of an input image signal, and perform the image processing optimum for high resolution for each region.

Embodiment 2

Figure 2:
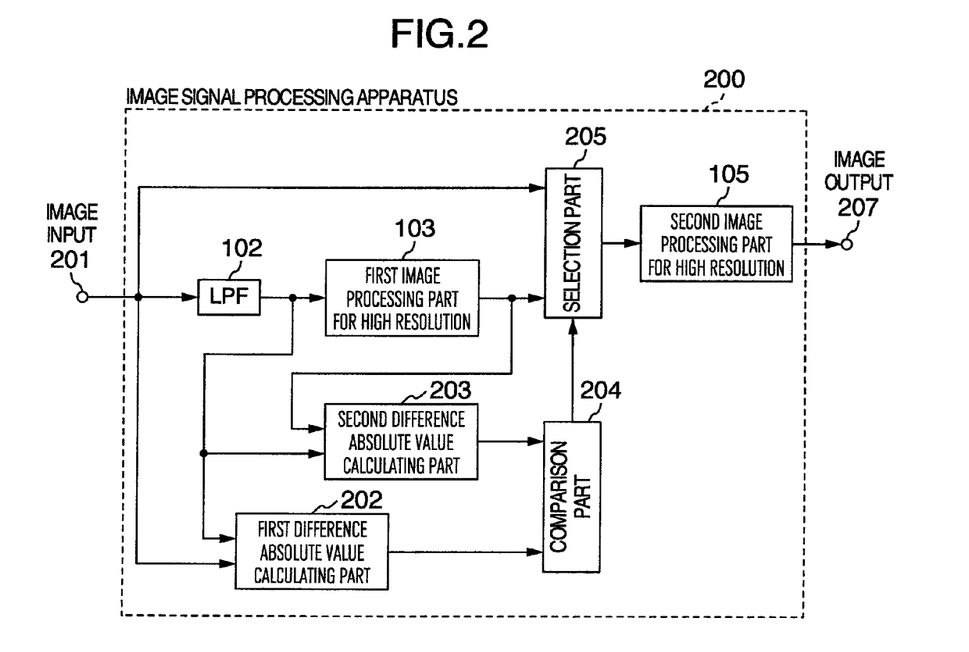
FIG. 2 is an explanatory view of Embodiment 2 of the present invention.

Next, Embodiment 2 of the present invention is described using FIG. 2.

In the image signal processing apparatus (100) of Embodiment 1, an input image signal is compared with an image signal after the image processing for high resolution by the first image processing part for high resolution (103). In an image signal processing apparatus (200) of Embodiment 2, an output of a first difference absolute value calculating part (203), which calculates a difference absolute value of pixel values before and after an image processing for high resolution, is compared with an output of a second difference absolute value calculating part (202), which calculates a difference absolute value between the pixel value of an input image and the pixel value after passing through the LPF part (102), to control a selection part (205). Namely, the comparison processing of an image signal differs from that of Embodiment 1. Here, an image signal after the LPF processing is used in the comparison processing to achieve a more stable comparison-operation processing.

Hereinafter, the detailed configuration and operation of the image signal processing apparatus (200) of Embodiment 2 are described.

In the image signal processing apparatus (200) of Embodiment 2, since the LPF part (102), the first image processing part for high resolution (103), and the second image processing part for high resolution (105) have the same configuration and operation as those of the LPF part (102), the first image processing part for high resolution (103), and the second image processing part for high resolution (105) of the image signal processing apparatus (100) of Embodiment 1, respectively, the description thereof is omitted. An image input part (201) and an image output part (207) of FIG. 2 have the same configuration and operation as those of the image input part (101) and the image output part (106) of FIG. 1, respectively.

In the image signal processing apparatus (200) of Embodiment 2, the first difference absolute value calculating part (202) calculates a difference absolute value between the pixel value of an input image signal and the pixel value of an image signal after the LPF processing. The second difference absolute value calculating part (203) calculates a difference absolute value between the pixel value of an image signal after the LPF processing and the pixel value of an image signal after the first image processing for high resolution. A comparison part (204) compares the first difference absolute value with the second difference absolute value.

Here, the calculation results of the first difference absolute value calculating part (202) and the second difference absolute value calculating part (203) and the comparison processing of the comparison part (204) are described using FIG. 4 and FIG. 5.

First, assume FIG. 4 and FIG. 5 show, for example, an input image in the region 302, respectively, as in Embodiment 1. Here, when an input image is a high resolution image, the first difference absolute value calculating part (202) calculates a difference absolute value between the high resolution image (401) and the low resolution image (402). The second difference absolute value calculating part (203) calculates a difference absolute value between the low resolution image (402) and the high resolution image (403). Then, when the input image is a high resolution image, both of the output result of the first difference absolute value calculating part (202) and the output result of the second difference absolute value calculating part (203) are difference absolute values between a low resolution image and a high resolution image and are relatively large values. Accordingly, the output result of the first difference absolute value calculating part (202) and the output result of the second difference absolute value calculating part (203) are relatively close and the difference between the both is relatively small.

Next, when an input image is a low resolution image, the first difference absolute value calculating part (202) calculates a difference absolute value between the low resolution image (501) and the low resolution image (502). The second difference absolute value calculating part (203) calculates a difference absolute value between the low resolution image (502) and the high resolution image (503). Then, when an input image is a low resolution image, the output result of the first difference absolute value calculating part (202) is an absolute difference between a low resolution image and a low resolution image and is a relatively small value. On the other hand, the output result of the second difference absolute value calculating part (203) is an absolute difference between a low resolution image and a high resolution image and is a relatively large value. Then, the output result of the first difference absolute value calculating part (202) is relatively far from the output result of the second difference absolute value calculating part (203), and this difference is a relatively large value.

Therefore, the comparison part (204) compares the output result of the first difference absolute value calculating part (202) with the output result of the second difference absolute value calculating part (203), and if the absolute value of the difference between the both is equal to or less than a predetermined threshold value, the comparison part (204) determines that the input image is a high resolution image. Moreover, if the absolute value of the difference between the both is larger than the predetermined threshold value, the comparison part (204) determines that the input image is a low resolution image.

The selection part (205) selects an image signal to be output, based on the comparison determination result by the comparison part (204), i.e., based on whether the input image is a low resolution image or a high resolution. Since the selection processing of the selection part (205) is the same as that of the comparison/selection part (104) of Embodiment 1, the detailed description thereof is omitted.

Here, the comparison processing of the comparison part (204) and the selection processing of the selection part (205) may be performed in a unit of pixel or may be performed in a unit of region comprising a plurality of pixels.

Figure 9:
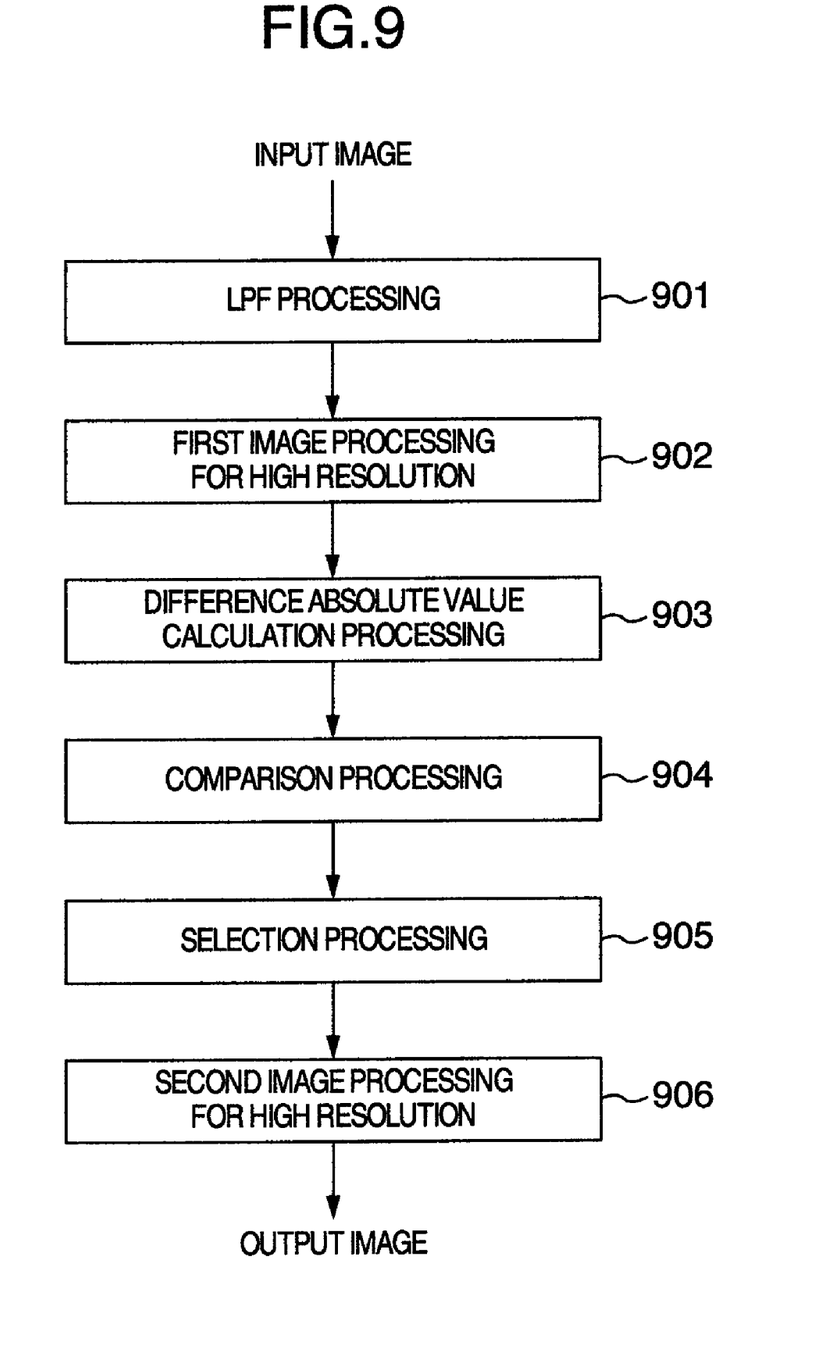
FIG. 9 is an explanatory view of Embodiment 2 of the present invention.

Next, a flow of the image signal processing according to Embodiment 2 is described using FIG. 9.

The LPF processing is performed on an input image signal to generate a low resolution image from the input image signal (901). Next, an image processing for high resolution is performed on the image signal upon which the LPF processing has been performed (902). Next, a first difference absolute value that is a difference absolute value between the pixel value of an input image signal and the pixel value of an image signal after the LPF processing, and a second difference absolute value that is a difference absolute value between the pixel value of an image signal after the LPF processing and the pixel value of an image signal after the image processing for high resolution are calculated (903). Next, the first difference absolute value is compared with the second difference absolute value (904). The details of the comparison processing are as described above. Next, an output image signal is selected based on the comparison processing result (905). Next, a second image processing for high resolution is performed on the selected image signal to output a high resolution image signal (906).

According to the image signal processing apparatus of Embodiment 2 described above, unlike the image signal processing apparatus of Embodiment 1, a low resolution image region and a high resolution image region can be compared with each other and discriminated based on a difference absolute value between the pixel value of an input image signal and the pixel value of an image signal after the LPF processing and a difference absolute value between the pixel value of an image signal after the LPF processing and the pixel value of an image signal after the image processing for high resolution. As a result, in addition to the advantage of Embodiment 1, the image signal processing apparatus of Embodiment 2 has an advantage in that a more stable comparison operation processing can be achieved by using an image signal after the LPF processing in the comparison processing. Therefore, according to the image signal processing apparatus of Embodiment 2, an image processing for high resolution can be performed more suitably on even an image signal having images with different resolutions mixed therein.

Embodiment 3

Figure 6:
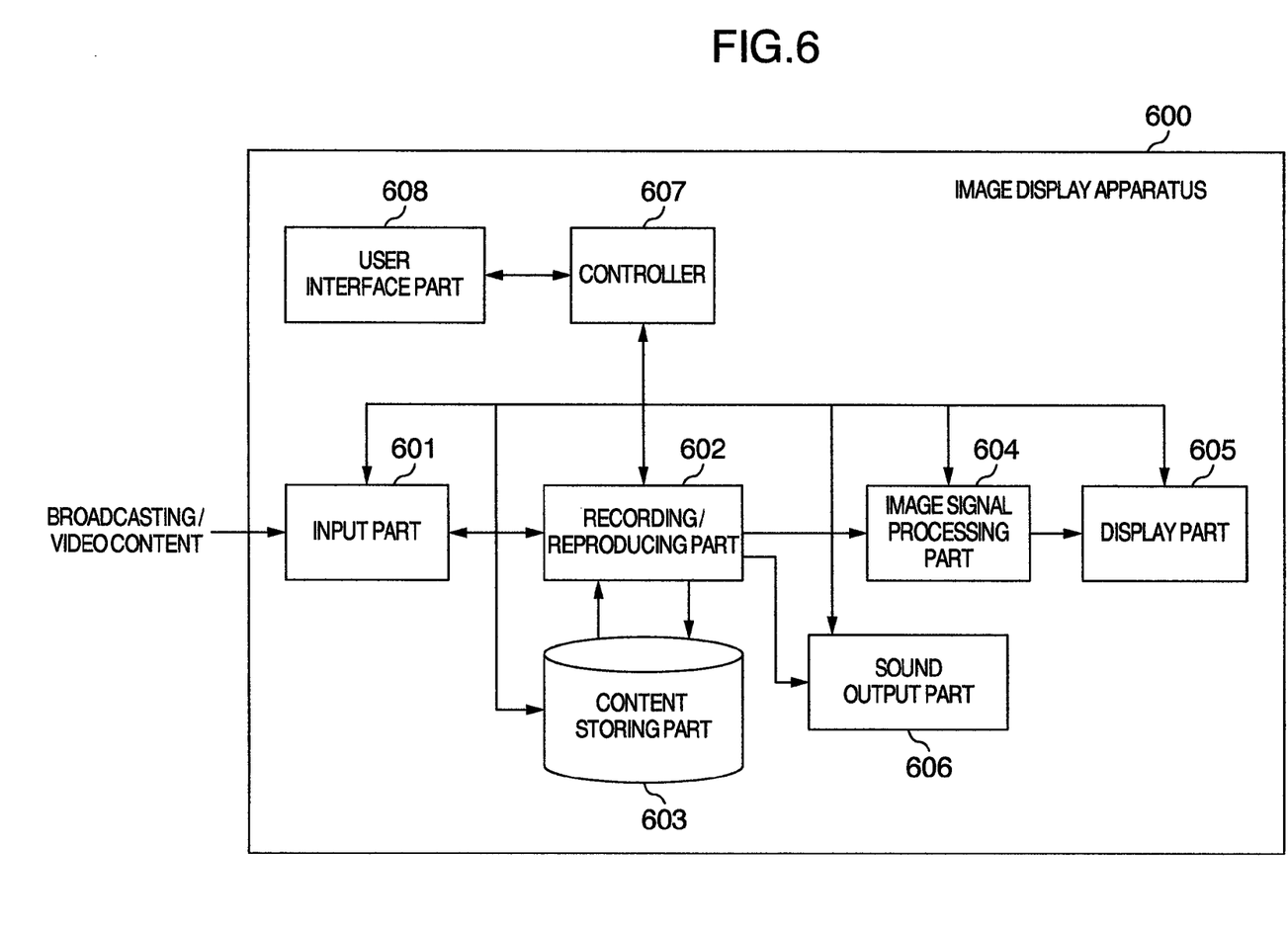
FIG. 6 is an explanatory view of Embodiment 3 of the present invention.

FIG. 6 is a block diagram showing an image display apparatus according to Embodiment 3 of the present invention.

The image display apparatus according to this embodiment performs the image signal processing described in Embodiment 1 or Embodiment 2.

In this view, an image display apparatus (600) comprises: for example, an input part (601) for inputting a broadcasting signal, an image content, or the like through a broadcast wave, a network, or the like containing a television signal or the like; a recording/reproducing part (602) that records or reproduces the content input from the input part (601); a content storing part (603) into which the recording/reproducing part (602) records the content; an image signal processing part (604), i.e., the image signal processing apparatus described in Embodiment 1, for performing an image signal processing on an image signal which the recording/reproducing part (602) reproduces; a display part (605) for displaying an image signal processed by the image signal processing part (604); a sound output part (606) for outputting a sound signal which the recording/reproducing part (602) reproduces; a controller (607) for controlling the respective components constituting the image display apparatus (600); a user interface part (608) through which a user operates the image display apparatus (600); and the like.

Since the detailed configuration and operation of the image signal processing part (604) are the same as those of the image signal processing apparatus described in Embodiment 1 or Embodiment 2, the description thereof is omitted.

Because the image display apparatus (600) includes the image signal processing part (604) that is the image signal processing apparatus described in Embodiment 1 or Embodiment 2, an image signal input to the input part (601) can be displayed on the display part (605) as a more suitably high resolution image signal.

Moreover, also in reproducing an image content stored in the content storing part (603) or an image content, the image content can be more suitably converted into a high resolution image signal and displayed on the display part (605).

Moreover, the image signal processing part (604) may be included in the recording/reproducing part (602) so as to perform the above-described image signal processing at the time of recording. In this case, since there is no need to perform the above-described image signal processing at the time of reproduction, the processing load at the time of reproduction can be advantageously reduced.

According to the image display apparatus according to Embodiment 3 of the present invention described above, an image display apparatus having the advantage described in Embodiment 1 or Embodiment 2 can be achieved. Namely, it is possible to achieve high resolution of an image and display the resultant image, more suitably.

Embodiment 4

Figure 7:
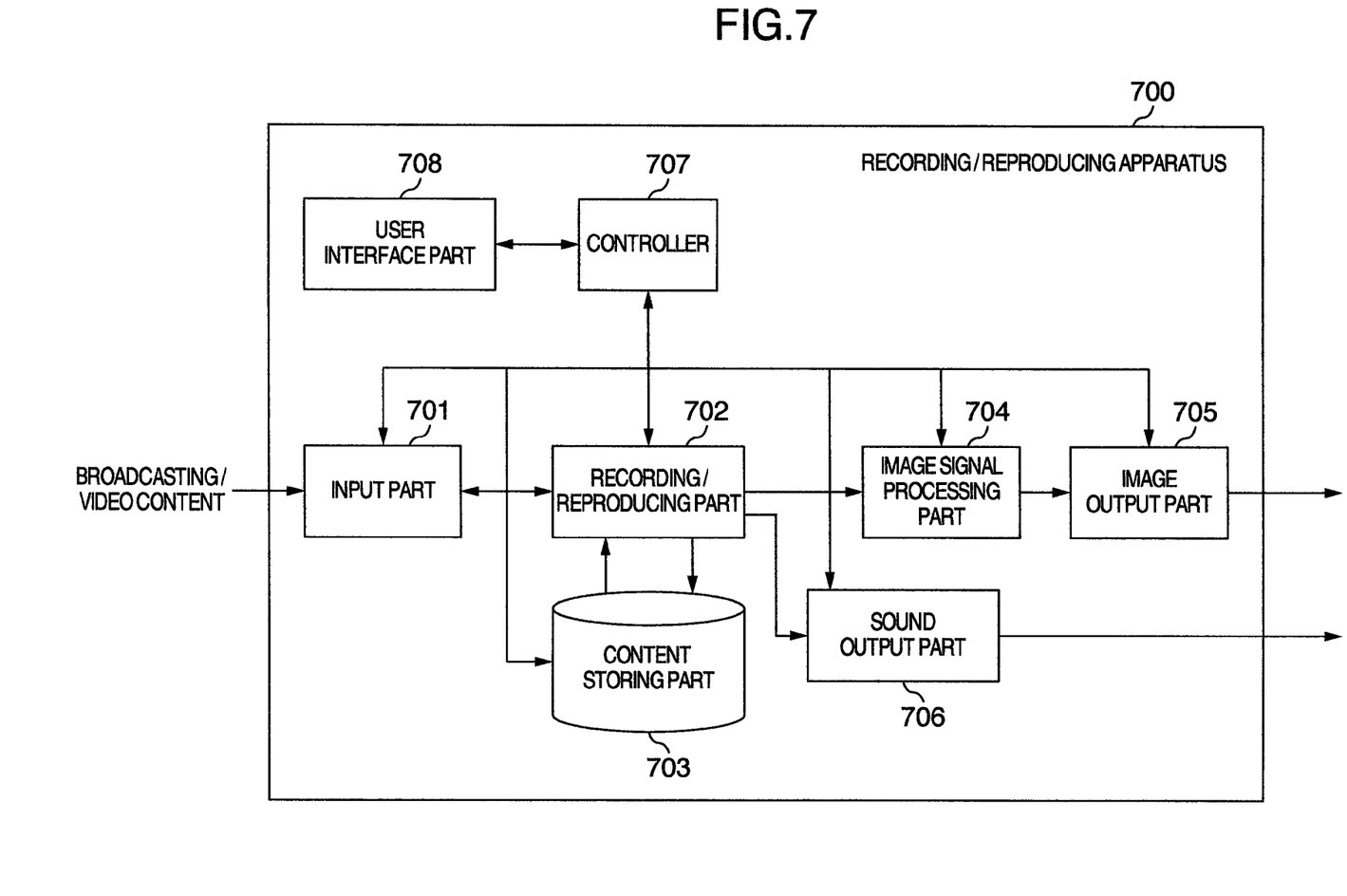
FIG. 7 is an explanatory view of Embodiment 4 of the present invention.

FIG. 7 is a block diagram showing a recording/reproducing apparatus according to Embodiment 4 of the present invention.

The recording/reproducing apparatus according to this embodiment performs the image signal processing described in the embodiment of Embodiment 1 or Embodiment 2.

In this view, a recording/reproducing apparatus (700) comprises: for example, an input part (701) for inputting a broadcasting signal, an image content, or the like through a broadcast wave, a network, or the like containing a television signal or the like; a recording/reproducing part (702) that records or reproduces the content input from the input part (701); a content storing part (703) into which the recording/reproducing part (702) records the content; an image signal processing part (704), i.e., the image signal processing apparatus described in Embodiment 1, for performing an image signal processing on an image signal which the recording/reproducing part (702) reproduces; an image output part (705) that outputs an image signal processed by the image signal processing part (704) to other apparatus or the like; a sound output part (706) that outputs a sound signal reproduced by the recording/reproducing part (702) to other apparatuses or the like; a controller (707) for controlling the respective components constituting the recording/reproducing part (700); a user interface part (708) through which a user operates the recording/reproducing apparatus (700); and the like.

Because the recording/reproducing apparatus (700) includes the image signal processing part (704) that is the image signal processing apparatus described in Embodiment 1, an image signal input to the input part (7601) can be output to other apparatus as a more suitably high resolution image signal.

Moreover, the image signal processing part (704) may be included in the recording/reproducing part (702) so as to perform the above-described image signal processing at the time of recording. In this case, since there is no need to perform the above-described image signal processing at the time of reproduction, the processing load at the time of reproduction can be advantageously reduced.

According to the recording/reproducing apparatus concerning Embodiment 4 of the present invention described above, a recording/reproducing apparatus having the advantage described in Embodiment 1 or Embodiment 2 can be achieved. Namely, it is possible to achieve high resolution of an image, and record, reproduce or output the resultant image more suitably.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image signal processing apparatus, comprising:
    a low pass filter part that performs a spatial low pass filter processing on a first image signal that is an input image;
    an image processing part for high resolution that generates a second image signal by performing an image processing for high resolution on an image after the low pass filter processing; and
    a comparison/selection part that compares corresponding regions in the first image signal and the second image signal, and selects either of the first image signal and the second image signal with respect to the regions based on this comparison result.

2. The image signal processing apparatus according to claim 1, wherein the comparison/selection part selects the image signal based on a magnitude of a first-order differentiation of an image around an image to be compared or on a variance of an image around the image to be compared.

3. The image signal processing apparatus according to claim 1, wherein the comparison/selection part compares a frequency component of the first image signal with a frequency component of the second image signal in the comparison processing.

4. The image signal processing apparatus according to claim 1, wherein the image processing part for high resolution performs a super-resolution processing for reducing aliasing.

5. The image signal processing apparatus according to claim 1, wherein the region is one pixel region.

6. An image signal processing apparatus, comprising:
a low pass filter part that performs a spatial low pass filter processing on a first image signal that is an input image;
an image processing part for high resolution that generates a second image signal by performing an image processing for high resolution on an image after the low pass filter processing;
a first difference absolute value calculating part that calculates a difference absolute value between a pixel value of the first image signal and a pixel value of an image signal after the low pass filter processing;
a second difference absolute value calculating part that calculates a difference absolute value between a pixel value of an image signal after the low pass filter processing and a pixel value of the second image signal;
a comparison part that compares the first difference absolute value with the second difference absolute value; and
a selection part that selects either of the first image signal that is an input image signal and the second image signal based on a comparison result of the comparison part.

7. The image signal processing apparatus according to claim 6, wherein if an absolute value of a difference between the first difference absolute value and the second difference absolute value is equal to or less than a predetermined threshold value in a comparison result of the comparison part, the selection part selects the first image signal, while if the absolute value of a difference between the first difference absolute value and the second difference absolute value is larger than the predetermined threshold value, the selection part selects the second image signal.

8. The image signal processing apparatus according to claim 6, wherein the comparison processing by the comparison part or the selection processing by the selection part is performed in a unit of pixel.

9. The image signal processing apparatus according to claim 6, wherein the image processing part for high resolution performs a super-resolution processing for reducing aliasing.

10. An image display apparatus, comprising:
an image signal processing part that is the image signal processing apparatus according to claim 1; and
a display part that displays an image based on an image signal from the image signal processing part.

11. A recording/reproducing apparatus, comprising:
a storing part that stores an input image; and
an image signal processing part, which is the image signal processing apparatus according to claim 1, that performs image processing on an image signal that is stored in the storing part and reproduced.

12. An image signal processing method, comprising:
a low pass filter processing step of performing a spatial low pass filter processing on a first image signal that is an input image;
a high resolution image producing step of generating a second image signal by performing an image processing for high resolution on an image after the low pass filter processing; and
a comparison/selection step of comparing corresponding regions in the first image signal and the second image signal and selecting either of the first image signal and the second image signal with respect to the regions based on this comparison result.

13. The image signal processing method according to claim 12, wherein the region is one pixel region.

14. An image signal processing method, comprising:
a low pass filter processing step of performing spatial low pass filter processing on a first image signal that is an input image;
a high resolution image producing step of generating a second image signal by performing an image processing for high resolution on an image after the low pass filter processing;
a first difference absolute value calculating step of calculating a difference absolute value between a pixel value of the first image signal and a pixel value of an image signal after the low pass filter processing;
a second difference absolute value calculating step of calculating a difference absolute value between a pixel value of an image signal after the low pass filter processing and a pixel value of the second image signal;
a comparison step of comparing the first difference absolute value with the second difference absolute value; and
a selection step of selecting either of the first image signal that is an input image signal and the second image signal based on a comparison result of the comparison part.

15. The image signal processing method according to claim 14, wherein the comparison processing by the comparison part or the selection processing by the selection part is performed in a unit of pixel.

* * * * *